(12) United States Patent
Funakoshi et al.

(10) Patent No.: US 6,682,713 B2
(45) Date of Patent: Jan. 27, 2004

(54) IRON SULFIDES, PROCESSES FOR PRODUCING THE SAME, IRON SULFIDE MIXTURE, HEAVY METAL TREATING AGENT, AND METHOD OF TREATING WITH THE AGENT

(75) Inventors: Hajime Funakoshi, Shinnanyo (JP); Mitsuru Takahashi, Shinnanyo (JP)

(73) Assignee: Tosoh Corporation, Yamaguchi (JP)

( * ) Notice: Subject to any disclaimer, the term of this patent is extended or adjusted under 35 U.S.C. 154(b) by 47 days.

(21) Appl. No.: 10/053,674

(22) Filed: Jan. 24, 2002

(65) Prior Publication Data

US 2002/0155058 A1 Oct. 24, 2002

(30) Foreign Application Priority Data

Jan. 26, 2001 (JP) .................................... P.2001-019022
Mar. 1, 2001 (JP) .................................... P.2001-056658

(51) Int. Cl.⁷ .......................... C01B 17/00; C01B 17/20
(52) U.S. Cl. ..................... 423/511; 423/138; 423/140; 423/155; 423/158; 423/179; 423/184
(58) Field of Search ................. 423/138, 140, 423/155, 158, 179, 184, 511

(56) References Cited

U.S. PATENT DOCUMENTS

| | | | |
|---|---|---|---|
| 3,740,331 A | 6/1973 | Anderson et al. | 210/53 |
| 3,970,738 A * | 7/1976 | Matsui et al. | 423/140 |
| 4,102,784 A | 7/1978 | Schlauch | 210/47 |
| 5,494,703 A | 2/1996 | Evangelou | 427/212 |
| 5,877,393 A | 3/1999 | Webster | 588/236 |
| 6,139,753 A * | 10/2000 | Taylor | 210/717 |
| 6,153,108 A | 11/2000 | Klock et al. | 210/722 |

FOREIGN PATENT DOCUMENTS

| | | |
|---|---|---|
| JP | 47-31806 | 11/1972 |
| JP | 48-11291 | 2/1973 |
| JP | 48-59005 A | 8/1973 |
| JP | 49-31152 | 3/1974 |
| JP | 49-43472 | 11/1974 |
| JP | 50-13294 | 2/1975 |
| JP | 50-96053 | 7/1975 |
| JP | 52-113559 | 9/1977 |
| JP | 52-126685 | 10/1977 |
| JP | 52-148473 | 12/1977 |
| JP | 53-102273 | 9/1978 |
| JP | 53-122673 A | 10/1978 |
| JP | 60-227881 | 11/1985 |
| JP | 63-111990 A | 5/1988 |
| WO | WO 96/14901 | 5/1996 |

OTHER PUBLICATIONS

J.C. Ward, The Structure and Properties of Some Iron Sulphides, Rev. Pure and Appl. Chem., 20, 175 (1970), pp. 176–207.

A. R. Lennie et al., Synthesis and Rietveld Crystal Structure Refinement of Mackinawite, Tetragonal FeS, Mineralogical Magazine, Dec., vol. 59, pp. 677–683.

Cynthia A. Coles et al., Lead and Cadmium Interactions with Mackinawite: Retention Mechanisms and the Role of pH, Environ. Sci. Technol. 2000, 34, pp. 996–1000.

Claims of CA 1069626, corresponding to JP–A 52–148473.

Structural and magnetic studies on heavy–metal–adsorbing iron sulphide nanoparticles produced by sulphate–reducing bacteria; Journal of Magnetism and Magnetics Materials, Elsevier Science Publishers, Amsterdam, NL, vol. 214, Nos. 1–2, May 2000; pp. 13–30 XP004198442.

* cited by examiner

*Primary Examiner*—Stanley S. Silverman
*Assistant Examiner*—Timothy C. Vanoy
(74) *Attorney, Agent, or Firm*—Sughrue Mion, PLLC

(57) ABSTRACT

Novel iron sulfides having excellent durability and excellent treating properties of heavy metals, processes for producing the iron sulfides, iron sulfide mixture, a heavy metal treating agent containing either of these novel iron sulfides as an effective component, and a method by which wastes containing various heavy metals are treated with the heavy metal treating agent are disclosed. The iron sulfide having a mackinawite structure which contains $FeM_xN_yS_z$ wherein M represents an alkaline earth metal, N represents an alkali metal, and x, y and z, indicating the molar proportions of the respective elements, represent numbers satisfying $0.01 < x \leq 0.5$, $y \leq 0.2$ and $0.7 \leq z \leq 1.4$, as an essential component.

7 Claims, 8 Drawing Sheets

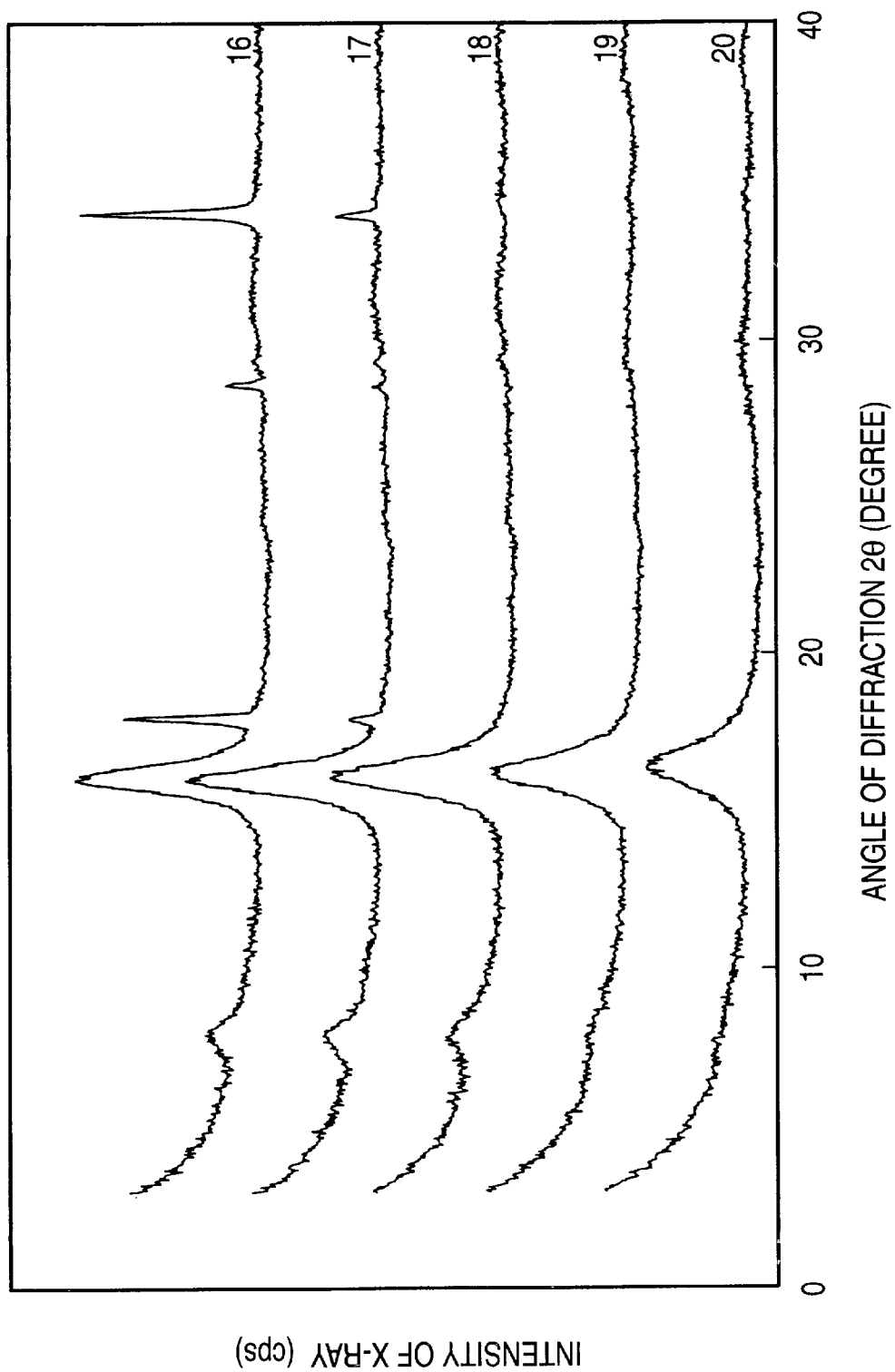

IRON SULFIDES, PROCESSES FOR PRODUCING THE SAME, IRON SULFIDE MIXTURE, HEAVY METAL TREATING AGENT, AND METHOD OF TREATING WITH THE AGENT

FIELD OF THE INVENTION

The present invention relates to novel iron sulfides having excellent durability, processes for producing the same, iron sulfide mixture, a heavy metal treating agent containing either of these novel iron sulfides as an effective component, and a method by which wastes containing various heavy metals are made harmless with the heavy metal treating agent.

DESCRIPTION OF THE RELATED ART

*Reviews of Pure and Applied Chemistry*, Vol.20, pp. 175–206 (1970) shows structures of iron sulfides. It discloses that the generally known iron sulfides for industrial use and the iron sulfide produced by melting a mixture of an iron powder and sulfur have a pyrrhotite structure, while the iron sulfide yielded by mixing a solution containing iron(II) ions with a solution containing sulfur ions has a mackinawite structure.

A technique in which wastes containing various heavy metals are made harmless with an iron sulfide is widely known. For example, a method for treating harmful heavy metals, e.g., Pb, Cd, Cr, Hg and As, in an aqueous solution with an iron sulfide for industrial use (pyrrhotite structure) is disclosed in, e.g., Japanese Patent Publication No. 43472/1974 and Japanese Patent Laid-Open Nos. 31806/1972, 13294/1975, 96053/1975, 126685/1977 and 227881/1985.

A technique is also known in which an iron sulfide (mackinawite structure) prepared by mixing a solution containing iron(II) ions with a solution containing sulfur ions is used to treat heavy metals. The iron sulfide obtained by this process is known to have the higher ability to treat heavy metals than iron sulfides for industrial use. For example, Japanese Patent Laid-Open Nos. 11291/1973, 31152/1974, 113559/1977, 148473/1977 and 102273/1978 disclose a method of treating harmful heavy metals with a solution containing iron(II) ions and a solution containing sulfur ions or with an iron sulfide obtained by mixing these solutions.

However, the iron sulfide having a mackinawite structure is so susceptible to oxidation that it reacts with moisture and oxygen in the air and thereby decomposes into sulfur and iron(III) hydroxide. Namely, the ability of this iron sulfide to treat heavy metals readily decreases. Because of this, treatment with the iron sulfide having a mackinawite structure has hitherto been conducted generally in such a manner that a solution containing iron(II) ions is mixed with a solution containing sulfur ions to prepare a slurry containing the iron sulfide and this slurry is immediately mixed with a waste to be treated, such as a wastewater. Although the solution containing sulfur ions which is usually employed is an aqueous solution of sodium sulfide or sodium hydrosulfide from the standpoints of cost and industrial availability, it is necessary to handle the solution by a skilled person having a knowledge of chemistry because of the harmfulness, corrosiveness, and offensive odor of the solution, etc. Namely, the solution is generally difficult to handle. Furthermore, there has been the following problem. In the case where the iron sulfide is used as a slurry, heightening the concentration of the iron sulfide is difficult because of the necessity of imparting a certain level of flowability. This limitation on iron sulfide concentration results, for example, in an increased transportation cost when the iron sulfide slurry is produced in, e.g., a factory. Moreover, when the iron sulfide is added in a large amount to treat a fly ash or soil containing heavy metals in a high concentration, the waste thus treated has too high a water content and is hence difficult to handle thereafter, although this problem is not aroused in the treatment of wastewaters and the like.

On the other hand, in the case where a powder of mackinawite iron sulfide is prepared from the slurry through filtration and drying, there have been the following problems. It is necessary to conduct the operation in an inert atmosphere or to add an antioxidant in order to prevent oxidation. The iron sulfide powder obtained should be stored in a container impermeable to oxygen and moisture in order to prevent the powder from oxidatively deteriorating. Alternatively, it is necessary to add a reducing agent to the powder so as to prevent oxidation. Even though a reducing agent is added, this does not basically eliminate the susceptibility to oxidative deterioration and the powder still has considerably poor storage stability because the iron sulfide begins to oxidize when the reducing agent has been consumed.

SUMMARY OF THE INVENTION

The invention has been made under the circumstances described above.

One object of the invention is to provide novel iron sulfides which have excellent durability and are highly effective in treating heavy metals.

Another object of the invention is to provide processes for synthesizing these novel iron sulfides.

Still another object of the present invention is to provide iron sulfide mixture.

Further object of the invention are to provide a heavy-metal treating agent comprising either of the iron sulfides as an effective component.

Still another object of the invention is to provide a method by which heavy metals contained in an ash, soil, wastewater or the like are made harmless with the treating agent.

Intensive investigations have been made to overcome the above-described problems, i.e., the drawback of the synthetic iron sulfides heretofore in use that those have poor durability although highly active in heavy metal treatment. As a result, it has found that the durability of an iron sulfide can be greatly improved by incorporating an alkaline earth metal into the iron sulfide at least in a given amount to convert the iron sulfide into an iron sulfide which contains an essential component having a novel composition represented by $FeM_xN_yS_z$ (wherein M represents an alkaline earth metal, N represents an alkali metal, and x, y, and z, indicating the molar proportions of the respective elements, represent numbers satisfying $0.01 < x \leq 0.5$, $y \leq 0.2$, and $0.7 \leq z \leq 1.4$). It has been further found that the novel iron sulfide is obtained by mixing an aqueous solution of a salt of bivalent iron, an aqueous solution containing sulfur ions and an alkaline earth metal ingredient and adjusting the pH of the resultant slurry to 7.0 or higher. Furthermore, it has been found that a heavy metal treating agent comprising this novel iron sulfide as an effective component is far more effective in treating various heavy metals than the synthetic iron sulfides heretofore in use and pyrrhotite iron sulfide. The invention has been completed based on these findings.

BRIEF DESCRIPTION OF THE DRAWINGS

FIG. 8 shows the results of analyses by X-ray diffractometry of the iron sulfide powders prepared in Example 8, Example 12, Example 13, Example 14 and Example 15, in which X axis (abscissa) indicates angle of diffraction 2θ (degree) and Y axis (ordinate) indicates the intensity of X-ray (unit: eps);

DESIGNATION OF THE REFERENCE NUMERALS

Figure 1:
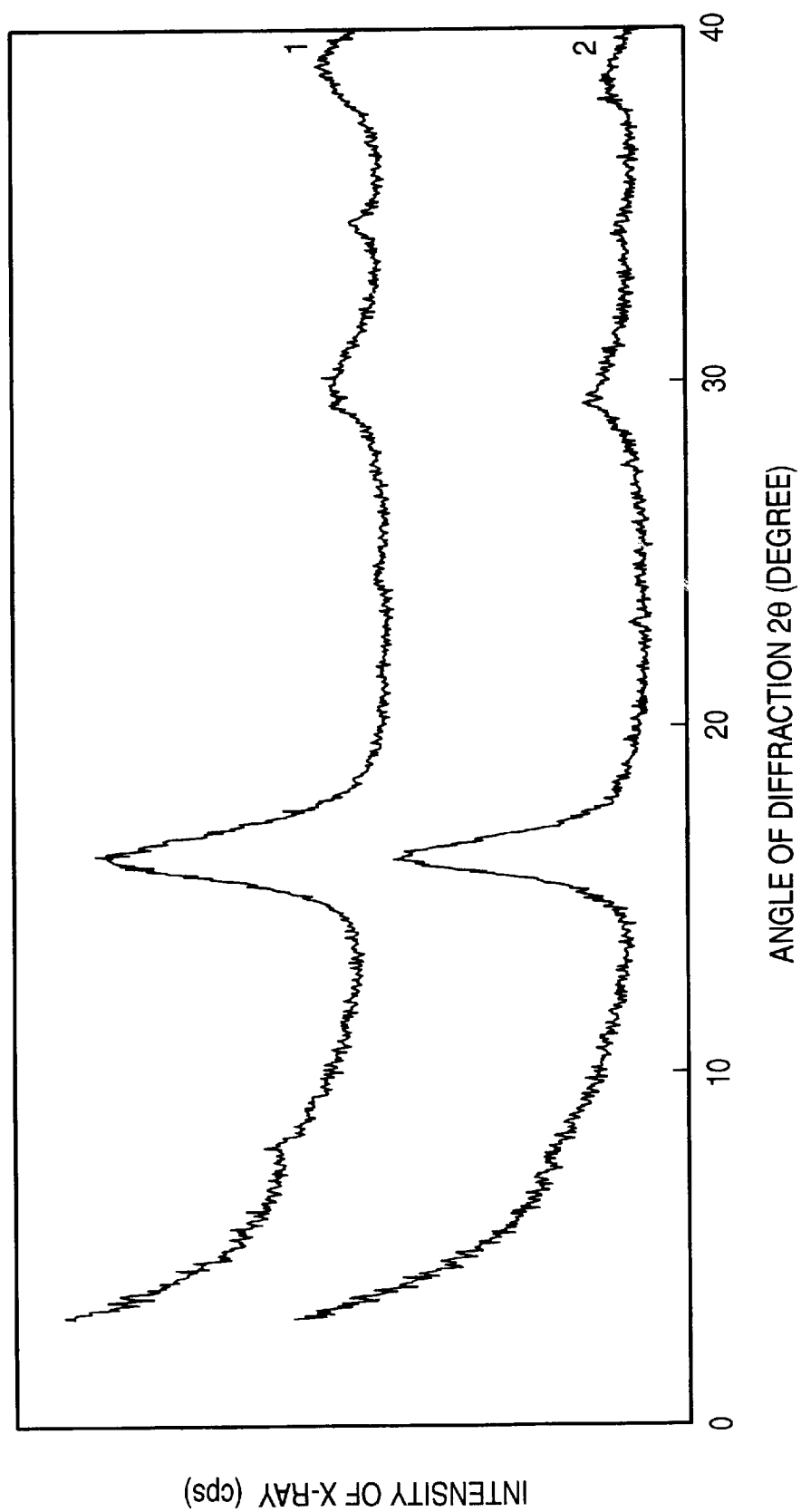
FIG. 1 shows the results of analyses by X-ray diffractometry of the iron sulfide powder prepared in Example 1 and of this powder which had undergone a one day durability test at 70° C. and 70% RH, in which X axis (abscissa) indicates angle of diffraction 2θ (degree) and Y axis (ordinate) indicates the intensity of X-ray (unit: cps)

1: X-ray diffraction pattern of the iron sulfide powder prepared in Example 1.

2: X-ray diffraction pattern of the iron sulfide powder prepared in Example 1 which had undergone a durability test.

3: X-ray diffraction pattern of the iron sulfide powder prepared in Example 1.

4: X-ray diffraction pattern of the iron sulfide powder prepared in Example 2.

5: X-ray diffraction pattern of the iron sulfide powder prepared in Example 3.

6: X-ray diffraction pattern of the iron sulfide powder prepared in Comparative Example 1.

7: X-ray diffraction pattern of the iron sulfide powder prepared in Comparative Example 1 which had undergone a durability test.

8: X-ray diffraction pattern of the iron sulfide powder prepared in Comparative Example 3.

9: X-ray diffraction pattern of the iron sulfide powder prepared in Comparative Example 3 which had undergone a durability test.

10: X-ray diffraction pattern of the iron sulfide powder prepared in Example 5.

11: X-ray diffraction pattern of the iron sulfide powder prepared in Example 5 which had undergone a durability test.

12: X-ray diffraction pattern of the iron sulfide powder prepared in Example 8.

13: X-ray diffraction pattern of the iron sulfide powder prepared in Example 8 which had undergone a durability test.

14: X-ray diffraction pattern of the iron sulfide powder prepared in Example 9.

15: X-ray diffraction pattern of the iron sulfide powder prepared in Example 9 which had undergone a durability test.

16: X-ray diffraction pattern of the iron sulfide powder prepared in Example 14.

17: X-ray diffraction pattern of the iron sulfide powder prepared in Example 13.

18: X-ray diffraction pattern of the iron sulfide powder prepared in Example 12.

19: X-ray diffraction pattern of the iron sulfide powder prepared in Example 8.

20: X-ray diffraction pattern of the iron sulfide powder prepared in Example 15.

DETAILED DESCRIPTION OF THE INVENTION

The invention will be explained in detail below.

It is essential that the iron sulfides of the invention should contain $FeM_xN_yS_z$ (wherein M represents an alkaline earth metal, N represents an alkali metal, and x, y, and z, indicating the molar proportions of the respective elements, represent numbers satisfying $0.01<x\leq0.5$, $y\leq0.2$, and $0.7\leq z\leq1.4$) as an essential component.

Iron sulfides are generally known to be non-stoichiometric with respect to the molar proportions of iron and sulfur. Namely, the molar ratio of sulfur to iron can be any value around 1. Like the mackinawite iron sulfides which have been used hitherto, the iron sulfides of the invention have a sulfur/iron molar ratio z of from 0.7 to 1.4. From the standpoint of obtaining a more stable mackinawite structure, the molar ratio z is preferably from 0.8 to 1.0.

In the iron sulfides of the invention, the amount of the alkaline earth metal is such that the alkaline earth metal/iron molar ratio x is in the range of $0.01<x\leq0.5$. In case where the molar ratio x is 0.01 or lower, an improvement in durability is not expected. On the other hand, in case where x exceeds 0.5, the resultant effect of improving stability is lower than in the case where x is within that range.

In preparing iron sulfides having the composition according to the invention, i.e., containing an alkaline earth metal in the specific amount, the iron sulfides obtained have different XRD patterns depending on the sequence of addition of ingredients including the alkaline earth metal. Specifically, an iron sulfide prepared by mixing a salt of bivalent iron with an aqueous solution containing sulfur ions, subsequently adding an alkaline earth metal ingredient thereto, and adjusting the pH of the mixture to 7 or higher shows an XRD pattern characteristic of mackinawite structures, while an iron sulfide prepared by mixing a salt of bivalent iron with an aqueous solution containing sulfur ions in the presence of an alkaline earth metal ingredient and adjusting the pH of the mixture to 7 or higher has a denatured mackinawite structure, which will be described later. The present inventors have found that in either case, no peak attributable to the alkaline earth metal ingredient is observed as long as the iron sulfide has a composition within the range according to the invention, and that the effect of improving durability is exceedingly high when the composition is within that range. In case where an alkaline earth metal ingredient is added in an amount exceeding the upper limit of that range, peaks attributable to a compound of the alkaline earth metal ingredient are observed and the resultant durability-improving effect is almost equal to that of compositions containing the alkaline earth metal in a lower proportion. It is, however, noted that the range of x optimal for the durability-improving effect varies slightly with the kind of the alkaline earth metal. The optimal ranges for magnesium, calcium, strontium and barium are $0.04 \leq x \leq 0.5$, $0.03 \leq x \leq 0.4$, $0.02 \leq x \leq 0.3$ and $0.01 \leq x \leq 0.2$, respectively.

Any desired combination of two or more of those four alkaline earth metal elements can be used in the invention. The most preferred of those four alkaline earth metal elements in the invention are calcium and/or magnesium. Calcium and magnesium not only are readily incorporated into iron sulfides, but also are industrially easily available at low cost unlike strontium and pose no problem concerning toxicity unlike barium.

In the iron sulfides of the invention, the upper limit of the amount of the alkali metal in terms of alkali metal/iron molar ratio y should be lower than in the case of the mackinawite iron sulfides which have been known. Specifically, it is essential that the molar ratio y should be 0.2 or lower. In case where the amount of the alkali metal is larger than 0.2, it is difficult to obtain a highly durable iron sulfide, which is an aim of the invention. The smaller the amount of the alkali metal, the more the durability can be expected to be improved. The amount of the alkali metal is more preferably 0.1 or smaller. The iron sulfides of the invention can be ones which contain no alkali metal. For example, an iron sulfide in which y is 0 can be obtained according to the invention by producing it from starting materials containing no alkali metal or by removing an alkali metal by washing, etc. The kind of the alkali metal varies depending on the starting materials used. For example, in the case where sodium sulfide or sodium hydrosulfide, which are industrially easily available, is used as a material for sulfur ions, N in the empirical formula is sodium.

In the invention, durability was evaluated at various temperatures and relative humidities. Mackinawite iron sulfides synthesized by the process used hitherto, when placed in a summer atmosphere having a temperature of up to 30° C. and a relative humidity of up to 70%, come to decompose in one day to show an XRD pattern bearing peaks attributable to sulfur. In 7 days, these iron sulfides completely decompose and the peaks attributable to a mackinawite structure disappear. When these iron sulfides are allowed to stand under the conditions of a temperature of 50° C. and a relative humidity of 70%, they completely decompose in one day and the peaks attributable to a mackinawite structure disappear. In contrast, the iron sulfides of the invention are characterized by having highly improved durability. Even when the iron sulfides of the invention are subjected to a one-day durability test under the severer conditions of a temperature of 70° C. and a relative humidity of 70%, the degree of remanence is 50% or higher (the degree of decomposition is lower than 50%).

The reason why the addition of an alkaline earth metal improves durability has not been elucidated. It is, however, presumed that the alkaline earth metal is incorporated into the iron sulfide and a layer which prevents oxidative decomposition is formed on the surface of the iron sulfide or that the alkaline earth metal serves to prevent the progress of oxidative decomposition.

It is further presumed that when an alkaline earth metal is incorporated into an iron sulfide, it does not replace iron in the iron sulfide but is incorporated in the form of the hydroxide or oxide of the alkaline earth metal.

The term "mackinawite structure" as used herein means the structure shown in JCPDS card (Powder Diffraction File), 15–37. The XRD pattern thereof is as shown in the following Table 1.

TABLE 1

| Spacing (Å) | I/I1 | hkl |
|---|---|---|
| 5.03 | 100 | 001 |
| 2.97 | 80 | 101 |
| 2.60 | 5 | 110 |
| 2.31 | 80 | 111 |
| 1.832 | 40 | 200 |
| 1.808 | 80 | 112 |
| 1.725 | 40 | 201 |
| 1.674 | 20 | 003 |
| 1.562 | 30 | 211 |
| 1.524 | 20 | 103 |

The term "denatured mackinawite structure" as used herein means a structure characterized by showing the XRD pattern of mackinawite structure shown in Table 1 above in which the spacing between the 001 planes has increased in the c axis direction to a value of from 5.03 Å to 5.53 Å and the ratio of the intensity for the diffraction peak attributable to any other hkl planes to that for the diffraction peak attributable to the 001 planes is 20/100 or lower.

Although the reason why a denatured mackinawite structure is formed has not been elucidated, it is presumed that when an alkaline earth metal ingredient is present during the generation of an iron sulfide, the alkaline earth metal is incorporated into the iron sulfide in such a manner that it elongates the c axis, i.e., increases the distance between each iron atom layer and the adjacent sulfur atom layers, with disordering the configuration of iron atoms and sulfur atoms along the a axis and b axis.

Iron sulfides having the denatured mackinawite structure described above were investigated, and as a result, the following was found. When this kind of iron sulfide is treated by dispersing it in water, adding a weak acid such as acetic acid thereto, and then recovering the iron sulfide by filtration and washing it, then part of the alkaline earth metal is lost by dissolution and the iron sulfide recovered shows an XRD pattern characteristics of the mackinawite structure. Namely, it was found that an iron sulfide of the denatured mackinawite structure reversibly changes into an iron sulfide of a mackinawite structure. Consequently, the denatured mackinawite structure according to the invention is thought to be a special form of the mackinawite structure which has been known.

Processes for producing the iron sulfides of the invention will be explained in detail below.

One process of the invention comprises mixing an aqueous solution of a salt of bivalent iron, an aqueous solution containing sulfur ions and an alkaline earth metal ingredient and adjusting the pH of the resultant slurry to 7.0 or higher to thereby obtain a mackinawite iron sulfide having excellent durability.

In the process of the invention, the sequence of mixing the three ingredients can be suitably selected. Namely, the following method may be employed: a method comprising mixing an aqueous solution of a salt of bivalent iron with an aqueous solution containing sulfur ions and then mixing the resultant mixture with an alkaline earth metal ingredient; a method comprising mixing an aqueous solution of a salt of bivalent iron with an alkaline earth metal ingredient and then mixing the resultant mixture with an aqueous solution containing sulfur ions; or a method comprising mixing an aqueous solution containing sulfur ions with an alkaline earth metal ingredient and then mixing the resultant mixture with an aqueous solution of a salt of bivalent iron. A method which is optimal for the production process can be selected.

The present inventors have further found that in the case where an alkaline earth metal ingredient is present when an iron sulfide is formed by mixing an aqueous solution of a salt of bivalent iron with an aqueous solution containing sulfur ions, the iron sulfide yielded has not a mackinawite structure but a denatured mackinawite structure.

The salt of bivalent iron used as an aqueous solution in the processes of the invention is not particularly limited as long as it is a water-soluble salt of bivalent iron. Examples thereof include iron(II) chloride, iron(II) nitrate, iron(II) sulfate, and iron(II) acetate. Most preferred of these is iron(II) chloride because it is industrially easily available and is inexpensive. A solution obtained by dissolving scrap iron or the like in hydrochloric acid or a waste liquid resulting from the washing of sheet or plate iron with hydrochloric acid can also be advantageously used. On the other hand, iron(II) sulfate is not preferred because it is apt to form a poorly soluble salt with the alkaline earth metal ingredient when this ingredient is calcium, strontium or barium, making it necessary to carefully and slowly mix starting materials. However, in the case of using magnesium as the alkaline earth metal ingredient, iron(II) sulfate can be advantageously used.

The concentration of the aqueous solution of a bivalent iron salt used is not particularly limited. However, too low concentrations may be industrially disadvantageous because of the necessity of a reaction vessel having a large capacity and an increase in the amount of the slurry to be filtered. Conversely, too high concentrations not only are apt to arouse troubles such as salt precipitation by temperature fluctuations but also may result in a slurry which has an increased viscosity and is difficult to handle or evenly mix. Specifically, the preferred range of the concentration of the salt of bivalent iron can be, for example, from 1 to 25 wt %, more preferably from 3 to 20 wt %, in terms of iron concentration.

The solution containing sulfur ions used in the processes of the invention is not particularly limited as long as it contains sulfur ions. Any solution prepared by dissolving the sulfide or hydrosulfide of an alkali metal salt, sulfide or hydrosulfide of an ammonium salt, or sulfide or hydrosulfide of an alkaline earth metal in water can be advantageously used. Of these sulfur compounds, sodium sulfide and sodium hydrosulfide are most preferably used because those are industrially easily available and are inexpensive. A solution prepared by causing an aqueous solution of an alkali, e.g., sodium hydroxide, to absorb the hydrogen sulfide obtained in a petroleum desulfurization step can also be advantageously used.

The concentration of the sulfur ion-containing solution to be used is not particularly limited. However, too high concentrations and too low concentrations are undesirable for the same reasons as in the case of the aqueous solution of a bivalent iron salt. Specifically, the preferred range of the concentration of sulfur ions can be, for example, from 1 to 15 wt %, more preferably from 2 to 10 wt %, in terms of sulfur concentration.

The alkaline earth metal ingredient is not particularly limited as long as it is water-soluble. Furthermore, an alkaline earth metal ingredient which is water-insoluble, such as carbonates, can be used as long as it dissolves in acid solutions. Examples of the alkaline earth metal ingredient include the chlorides, carboxylates, nitrates, hydroxides and sulfides of alkaline earth metals.

The ratio in which the aqueous solution of a salt of bivalent iron and the aqueous solution containing sulfur ions are mixed with each other is not particularly limited. However, too high proportions of sulfur ions not only result in an increased material cost but also may arouse a problem that the sulfur ions partly remain unreacted in the mother liquor, resulting in the necessity of wastewater treatment. Conversely, too low proportions of sulfur ions arouse a problem that the excess iron precipitates as iron hydroxide to yield a mixture of an iron sulfide and the hydroxide. Although this iron sulfide retains intact properties, the iron sulfide has been diluted by the iron hydroxide and, hence, appears to have reduced properties. It is therefore preferred to mix the two solutions in such a proportion that the iron/sulfur molar ratio is in the range of from 1/0.7 to 1/1.8, more preferably from 1/0.8 to 1/1.5.

The ratio in which the aqueous solution of a salt of bivalent iron and the alkaline earth metal ingredient are mixed with each other varies depending on the kind of the alkaline earth metal. However, in case where the amount of the alkaline earth metal is too small, a mackinawite iron sulfide having excellent durability according to the invention cannot be obtained. Consequently, in the case where the alkaline earth metal ingredient is magnesium (Mg), it is preferred to mix the two ingredients in such a proportion that the Fe/Mg molar ratio is 1/0.04 or smaller. In the case where the alkaline earth metal ingredient is calcium (Ca), the two ingredients are preferably mixed in such a proportion that the Fe/Ca molar ratio is 1/0.03 or smaller. In the case where the alkaline earth metal ingredient is strontium (Sr), the two ingredients are preferably mixed in such a proportion that the Fe/Sr molar ratio is 1/0.02 or smaller. In the case where the alkaline earth metal ingredient is barium (Ba), the two ingredients are preferably mixed in such a proportion that the Fe/Ba molar ratio is 1/0.01 or smaller.

Methods for the mixing are not particularly limited, and the semi-batch process or continuous process known in chemical engineering can be used.

The temperature at which the ingredients are mixed is not particularly limited. There is no need of cooling or heating. For example, a temperature of from 10 to 60° C. can be used.

The stirring to be conducted for the mixing is not particularly limited. Any degree of stirring may be used without arousing particular problems, as long as the slurry containing the iron sulfide yielded does not stagnate.

The rate at which the feed materials are mixed is not particularly limited. However, too low mixing rates may result in lowered productivity, while too high mixing rates may result in local stagnation or a viscosity increase. Consequently, in the case of a semi-batch process, for example, a rate of addition at which all the feed materials are mixed in a period of from 1 to 240 minutes, preferably from 3 to 120 minutes, maybe selected. In the case of a continuous process, a material feed rate may be selected so that the average residence time is from 10 to 240 minutes, preferably from 15 to 120 minutes.

At the time when the mixing described above is completed, a slurry containing an iron sulfide of the invention is obtained. In the invention, it is essential that the slurry pH be 7.0 or higher at the time when the mixing has been completed. Although an alkali source may be added after completion of the mixing in order to adjust the slurry pH to 7.0 or higher, it is more preferred to add an alkali source beforehand to the aqueous solution containing sulfur ions. The alkali source is not particularly limited, and examples thereof include the hydroxides of alkali metals and the hydroxides of alkaline earth metals. Specific examples thereof include sodium hydroxide, potassium hydroxide, calcium hydroxide and barium hydroxide. In case where the slurry has a pH lower than 7.0, the alkaline earth metal is not incorporated into the iron sulfide, so that an iron sulfide of the invention cannot be obtained. The higher the slurry pH, the more preferred. Specifically, the slurry pH is adjusted to preferably 8.0 or higher, more preferably 10.0 or higher, most preferably around 12.0.

After completion of the mixing of the feed materials, aging may be conducted by continuing the stirring of the resultant slurry so as to keep the whole slurry homogeneous. The period of aging is not particularly limited, and the aging may be conducted, for example, for a period of from 0 to 300 minutes.

By the method described above, a slurry containing an iron sulfide of the invention is obtained. Although this slurry may be used as it is for the treatment of heavy metals, use thereof not only results in an increased transportation cost but may arouse the following problem. When this iron sulfide is added in a large amount to treat a fly ash or soil containing heavy metals in a high concentration, the waste thus treated has too high a water content and is hence difficult to handle thereafter. Because of these drawbacks, the slurry is usually converted to an iron sulfide powder through filtration, washing, and subsequent drying.

For the filtration and washing, known methods can be used. However, in case where filtration and washing are insufficient, the alkali metal remaining in the iron sulfide makes it difficult to obtain an iron sulfide having excellent durability. Consequently, the filtration and washing should be conducted under such conditions that the iron sulfide to be obtained through the filtration and washing has an alkali metal content of 0.2 mol or smaller, preferably 0.1 mol or smaller, per mole of the iron.

The drying may be conducted by any known method. However, it is more preferred to conduct drying in an inert gas atmosphere or in vacuum from the standpoint of preventing the iron sulfide from oxidizing.

An iron sulfide of the invention can be obtained by the method described above.

As a result of further investigations, it has been found that by adding any of various alkaline earth metal compounds to an iron sulfide having the mixture according to the invention, an iron sulfide mixture is obtained which can be more advantageously used as a heavy metal treating agent; to provide the iron sulfide mixture is one of the objects of the invention. This iron sulfide mixture can be prepared by preparing an iron sulfide having the component according to the invention, subsequently adding an alkaline earth metal compound thereto, and mixing the resultant mixture, for example, mechanically with a ball mill or the like. Alternatively, the iron sulfide mixture can be prepared by preparing an iron sulfide using an alkaline earth metal ingredient excessively in an amount larger than the upper limit according to the composition of an iron sulfide according to the invention.

Examples of the alkaline earth metal compound which is added or is used excessively include the hydroxides, carboxylates, phosphates, sulfites, sulfates and carbonates of alkaline earth metals. Specific examples thereof include magnesium hydroxide, calcium hydroxide, strontium hydroxide, barium hydroxide, the corresponding alkaline earth metal salts of acetic acid, formic acid, oxalic acid, citric acid, stearic acid, etc., the corresponding alkaline earth metal salts of phosphoric acid and polyphosphoric acids, such as calcium hydrogen phosphate, the carbonates of alkaline earth metals, such as magnesium carbonate and calcium carbonate, and the sulfates of alkaline earth metals, such as magnesium sulfate, calcium sulfate, and barium sulfate. Examples thereof further include alkaline earth metal salts of sulfurous acid and ascorbic acid, which have an antioxidant action, etc.

Those alkaline earth metal compounds do not decrease the durability of the iron sulfide of the invention, and have various functions according to the kinds thereof. For example, those compounds function to improve the activity of the iron sulfide in treating heavy metals based on the iron sulfide-supporting effect thereof and to improve durability. They further function as an aid in heavy metal treatment and to improve handleability. One or more alkaline earth metal salts may be added to the iron sulfide of the invention according to purposes. For example, when an acid fly ash is to be treated, it is preferred to add an alkali as an aid. In this case, a mixture of an iron sulfide of the invention and the hydroxide of an alkaline earth metal can be advantageously used. In the case where the waste to be treated contains a large amount of an oxidizing ingredient such as hexavalent chromium, a mixture of an iron sulfide of the invention and a sulfurous acid salt can be advantageously used. It has been found that although the iron sulfides of the invention have excellent durability, addition of a carboxylic acid salt, especially the acetate, of an alkaline earth metal further improves the durability. Such salts can be added for storage under severe conditions.

The amount of such alkaline earth metal compounds to be added is not particularly limited and varies depending on purposes. For example, those compounds can be added in an amount of from 0.1 to 100 parts by weight per 100 parts by weight of the iron sulfide of the invention.

The iron sulfides and the mixture comprising iron sulfide of the invention have exceedingly high durability, and a "heavy metal treating agent" comprising any of those as an effective component has exceedingly high performance. The heavy metal treating agent of the invention will be explained below in detail.

Examples of heavy metals which can be treated with the heavy metal treating agent of the invention include lead, cadmium, chromium, mercury, arsenic, selenium, copper, nickel, antimony and molybdenum. It is a matter of course that the treating agent of the invention can be used not only in the treatment of a waste containing any one of those heavy metals but in the treatment of a waste containing any two or more of those elements.

The heavy metal treating agent of the invention is extremely useful for treating refuse incineration ashes and fly ashes containing heavy metals. In refuse incineration ashes and fly ashes, the heavy metals which were contained in various refuses have been concentrated. In particular, this concentration is considerable in fly ashes and fused fly ashes, and many fused fly ashes contain heavy metals, such as lead, in an amount on the order of percent and should be treated so as to be made harmless. The fly ashes and fused fly ashes are of several kinds such as, e.g., alkaline fly ashes, neutral fly ashes, alkaline fused fly ashes, and neutral fused fly ashes depending on differences in the structure of incinerators and in the method of operation thereof. Furthermore, it is known that the kind and content of heavy metals contained in such a fly ash vary considerably depending on the kind of the refuse incinerated. However, the heavy metal treating agent of the invention can be applied to any kind of fly ash. The heavy metal treating agent of the invention and water are added to any of those refuse incineration ashes and fly ashes and the resulting mixture is kneaded.

The amount of the heavy metal treating agent of the invention to be added cannot be fixed unconditionally because it varies depending on the kind and total amount of the heavy metals contained in the refuse incineration ash or fly ash to be treated. For example, the amount thereof is generally from 0.1 to 50 wt %, preferably from 0.5 to 30 wt %, based on the weight of the refuse incineration ash or fly ash. It is desirable that the refuse incineration ash or fly ash be sampled beforehand to determine the minimum addition amount through a laboratory test and further determine the optimal addition amount while taking account of fluctuations of the amount of heavy metals contained in the refuse incineration ash or fly ash. Even though the treating agent is added excessively, no problems arise because the mercury (Hg), for example, becomes not a soluble substance but a polysulfide.

The amount of water added varies depending on the nature of the refuse incineration ash or fly ash. For example, however, the amount thereof is usually from 10 to 40 wt % based on the weight of the refuse incineration ash or fly ash. Methods for kneading and the kneading period are not particularly limited, and the kneading can be conducted by a known method. By the treatment, the soluble heavy metals are converted to insoluble sulfides or iron salts.

The heavy metal treating agent of the invention is effective also in the treatment of a soil containing heavy metals. The heavy metal treating agent is added to the soil containing heavy metals, optionally together with water, and the resultant mixture is kneaded.

The amount of the heavy-metal treating agent of the invention to be added cannot be fixed unconditionally because it varies depending on the total amount of the heavy metals contained in the soil. For example, the amount thereof is from 0.1 to 20 wt % based on the weight of the soil to be treated. It is desirable that the soil be sampled beforehand to determine the minimum addition amount through a laboratory test so as to add the treating agent in slight excess for safety. In the case where the amount of water contained in the soil is small, water may be optionally added to the soil so as to result in a water content in the soil of usually from 10 to 60 wt %, although it varies depending on the kind of the soil. Methods for kneading and the kneading period are not particularly limited, and the kneading can be conducted by a known method. By the treatment, the soluble heavy metals are converted to insoluble sulfides or iron salts.

Furthermore, the heavy metal treating agent of the invention can be used to treat a wastewater containing heavy metals. The heavy metal treating agent is added to the wastewater containing heavy metals and the resultant mixture is stirred. The amount of the heavy metal treating agent added cannot be fixed unconditionally because it varies depending on the total amount of the heavy metals contained in the wastewater. It is desirable that the wastewater be sampled beforehand to determine the minimum addition amount through a laboratory test so as to add the treating agent in slight excess for safety. In this treatment, when the wastewater has a low pH, the iron sulfide may decompose to generate hydrogen sulfide. It is therefore preferred to adjust the pH of the wastewater beforehand. In this case, the pH of the wastewater is adjusted to 3.0 or higher, preferably 6.0 or higher. Methods for stirring and the stirring period are not particularly limited, and the stirring can be conducted by a known method. By the treatment, the heavy metals contained in the wastewater are converted to insoluble sulfides or iron salts. The treating agent can be used in combination with, for example, an inorganic coagulant/precipitant usually used in coagulation/precipitation treatments, such as ferric chloride, poly (aluminum chloride), or aluminum sulfate, or with a polymeric coagulant which accelerates coagulation.

The invention will be described in more detail by reference to the following Examples, but the invention should not be construed as being limited to these Examples only. The methods for determination used in the Examples are as follows.

(1) Methods for Determining Chemical Composition

Iron, sulfur, calcium, strontium and barium were determined with a fluorescent X-ray spectrometer (Type JSX-3200, manufactured by JEOL Ltd.). Sodium, magnesium and iron were determined by dissolving the sample in hydrochloric acid and analyzing the solution with an ICP emission spectrometer (Type Optima 3000, manufactured by Perkin Elmer Corp.). After the determinations, the molar proportion of each of the alkaline earth metal element, alkali metal element, and sulfur to the iron was determined.

(2) Method for Determining Crystal Structure

Determination was made with an X-ray diffractometer (Type MXP-3, manufactured by Mac Science; copper target).

(3) Proportion of Residual Iron Sulfide

The proportion was calculated using the following equation:

Proportion of residual iron sulfide (%)=I2/I1×100 wherein I1 is the main peak intensity for the iron sulfide before a durability test and I2 is the main peak intensity for the iron sulfide after the durability test.

EXAMPLE 1

An aqueous iron(II) chloride solution (0.5 mol/liter) and an aqueous sodium sulfide solution (1.0 mol/liter) were continuously introduced with stirring into a stainless-steel vessel for continuous reaction having an effective capacity of 750 ml at rates of 500 ml/hr and 250 ml/hr, respectively, while keeping the vessel at 25° C. Thus, an iron sulfide slurry was prepared.

Figure 2:
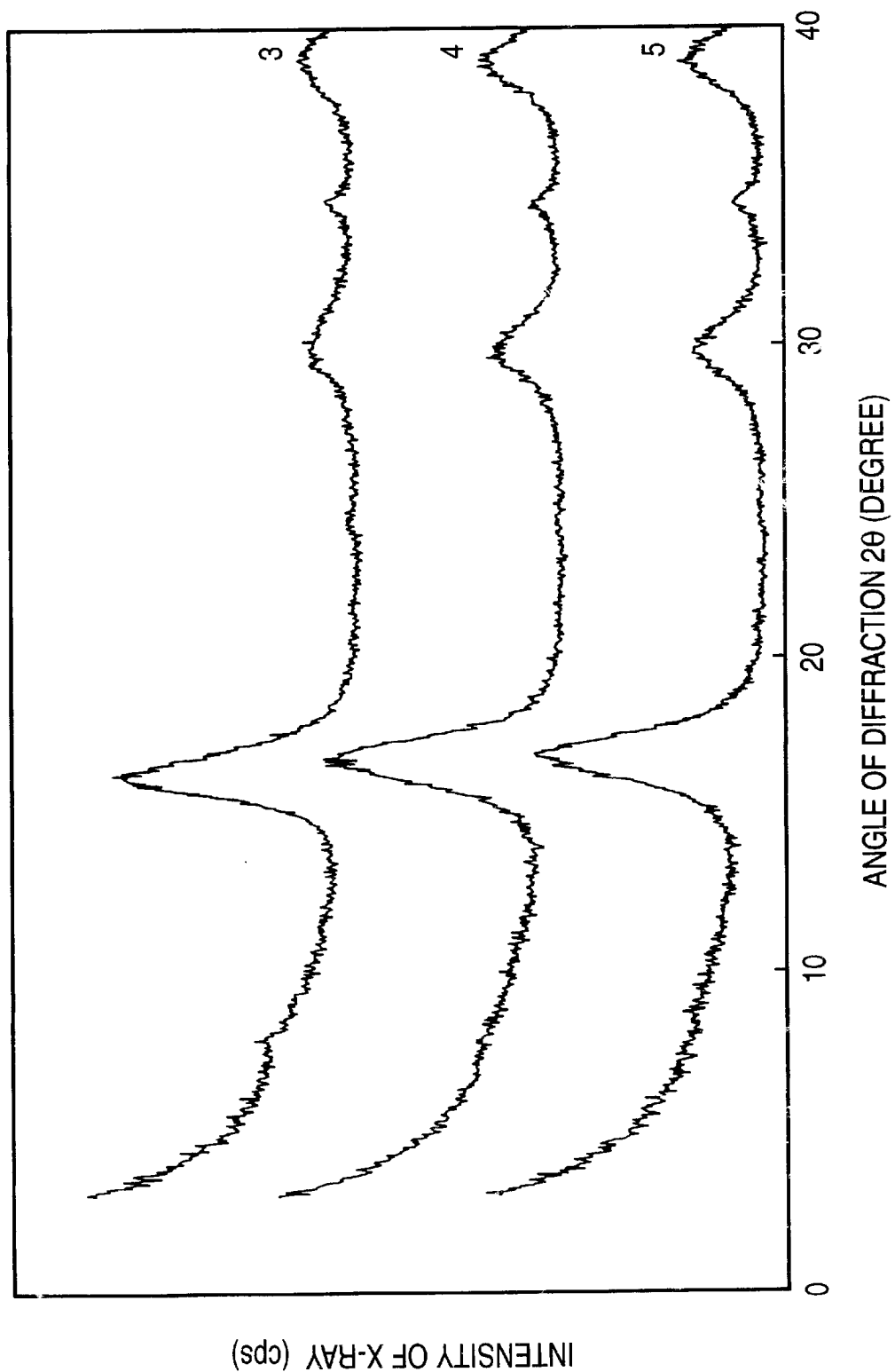
FIG. 2 shows the results of analyses by X-ray diffractometry of the iron sulfide powders prepared in Example 1, Example 2 and Example 3. The X axis (abscissa) indicates angle of diffraction 2θ (degree) and the Y axis (ordinate) indicates the intensity of X-ray (unit: cps)

Into a glass reactor having a capacity of 2 liters was introduced 1,000 ml of the iron sulfide slurry obtained. Thereto was added 83 mmol of calcium chloride with stirring. Furthermore, 48% aqueous NaOH solution was added to adjust the slurry pH to 12.8. This slurry was then aged by continuously stirring it for 60 minutes. The slurry obtained after the aging was filtered, and the obtained cake was washed, dried, and then pulverized to obtain an iron sulfide powder. X-ray diffractometry revealed that the iron sulfide powder obtained had a mackinawite structure. The X-ray diffraction chart obtained is shown in FIGS. 1 and 2. Analysis for composition determination revealed that the molar proportions of the respective components were represented by $FeCa_{0.22}Na_{0.016}S_{1.00}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a mackinawite structure and no peak attributable to sulfur or iron(III) oxide, which are products of decomposition of iron sulfide, was observed. The X-ray diffraction chart obtained is shown in FIG. 1. The proportion of the residual iron sulfide was calculated from the ratio between the main peak intensity for the iron sulfide before the durability test and that for the iron sulfide after the test, and was found to be 85%.

EXAMPLE 2

An iron sulfide powder was obtained by conducting completely the same procedure as in Example 1, except that the slurry pH was adjusted to 11.7. X-ray diffractometry revealed that the iron sulfide powder obtained had a mackinawite structure. The X-ray diffraction chart obtained is shown in FIG. 2. Analysis for composition determination revealed that the molar proportions of the respective components were represented by $FeCa_{0.073}Na_{0.032}S_{0.99}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a mackinawite structure and slight peaks attributable to sulfur, which is a product of decomposition of iron sulfide, were observed. The proportion of the residual iron sulfide was calculated from the ratio between the main peak intensity for the iron sulfide before the durability test and that for the iron sulfide after the test, and was found to be 71%.

EXAMPLE 3

An iron sulfide powder was obtained by conducting completely the same procedure as in Example 1, except that the slurry pH was adjusted to 10.3. X-ray diffractometry revealed that the iron sulfide powder obtained had a mackinawite structure. The X-ray diffraction chart obtained is shown in FIG. 2. Analysis for composition determination revealed that the molar proportions of the respective components were represented by $FeCa_{0.035}Na_{0.077}S_{0.99}$.

Subsequently, part of the iron sulfide powder obtained was placed in a thermo-hygrostatic chamber having a temperature of 70° C. and a relative humidity of 70% and allowed to stand therein for 1 day to conduct a durability test. As a result of the analysis by X-ray diffractometry of the powder which had undergone the durability test, peaks attributable to sulfur, which is a product of decomposition of iron sulfide, were observed besides peaks attributable to mackinawite iron sulfide. The proportion of the residual iron sulfide was calculated from the ratio between the main peak intensity for the iron sulfide before the durability test and that for the iron sulfide after the test, and was found to be 53%.

EXAMPLE 4

An iron sulfide powder was obtained by conducting completely the same procedure as in Example 1, except that the amount of calcium chloride added was changed to 220 mmol and the slurry pH was adjusted to 12.6. The iron sulfide powder obtained was analyzed by X-ray diffractometry. As a result, peaks attributable to calcium hydroxide were observed besides peaks attributable to mackinawite iron sulfide. Analysis for composition determination revealed that the molar proportions of the respective components were represented by $FeCa_{0.43}Na_{0.004}S_{0.98}$.

Subsequently, part of the iron sulfide powder obtained was placed in a thermo-hygrostatic chamber having a temperature of 70° C. and a relative humidity of 70% and allowed to stand therein for 1 day to conduct a durability test. As a result of the analysis by X-ray diffractometry of the powder which had undergone the durability test, peaks attributable to calcium hydroxide and calcium carbonate were observed besides peaks attributable to mackinawite iron sulfide. The proportion of the residual iron sulfide was calculated from the ratio between the main peak intensity for the iron sulfide before the durability test and that for the iron sulfide after the test, and was found to be 87%.

Comparative Example 1

Figure 3:
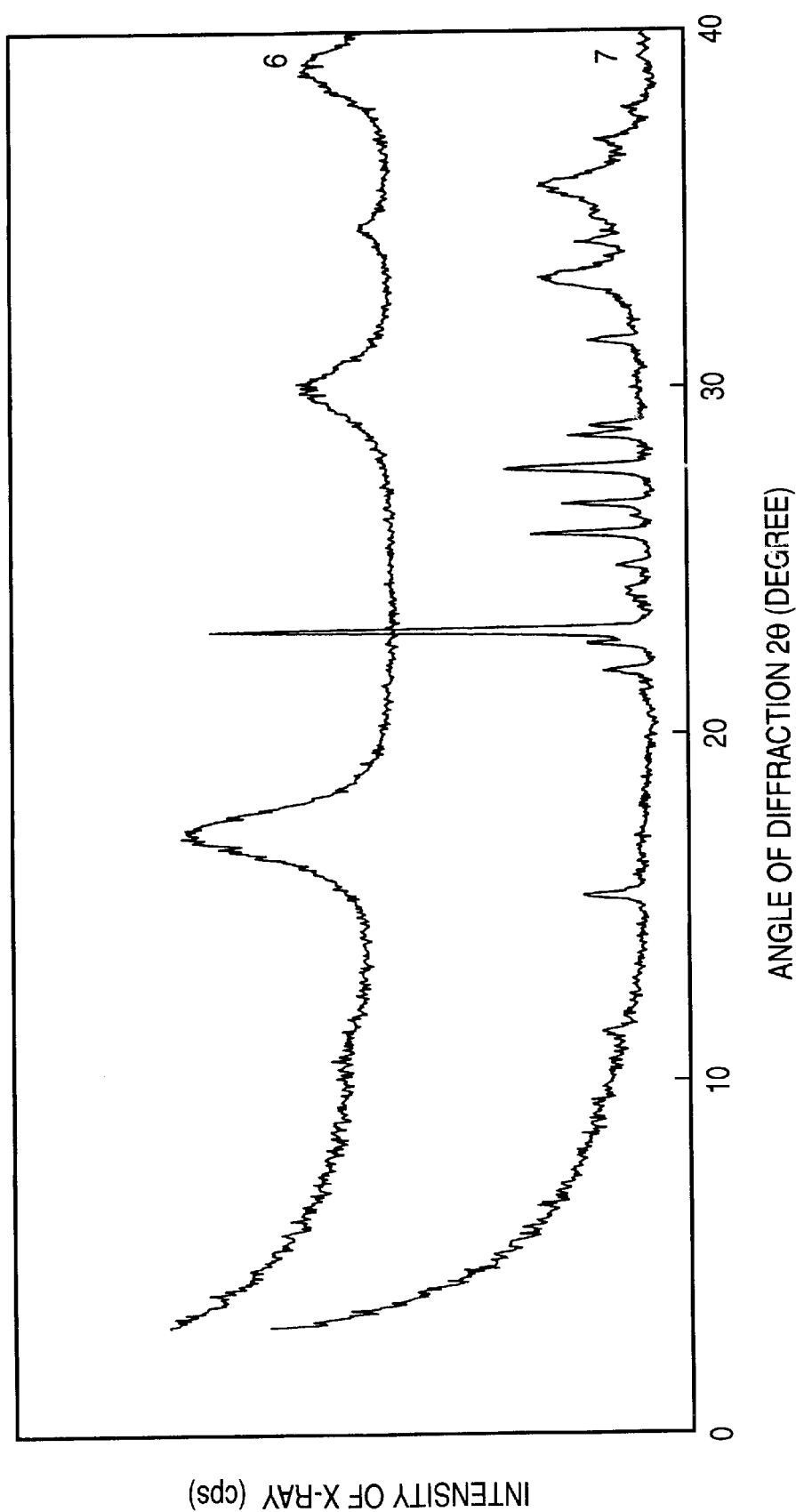
FIG. 3 shows the results of analyses by X-ray diffractometry of the iron sulfide powder prepared in Comparative Example 1 and of this powder which had undergone a one day durability test at 70° C. and 70% RH, in which X axis (abscissa) indicates angle of diffraction 2θ (degree) and Y axis (ordinate) indicates the intensity of X-ray (unit: cps)

An iron sulfide slurry continuously prepared by the same method as in Example 1 was filtered, and the obtained cake was washed, dried, and then pulverized to obtain an iron sulfide powder. X-ray diffractometry revealed that the iron sulfide powder obtained had a mackinawite structure. The X-ray diffraction chart obtained is shown in FIG. 3. Analysis for composition determination revealed that the molar proportions of the respective components were represented by $FeNa_{0.22}S_{0.99}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test was a mixture of sulfur and iron(III) oxide, which are products of decomposition of iron sulfide, and no peak attributable to an iron sulfide was observed. The X-ray diffraction chart obtained is shown in FIG. 3.

Comparative Example 2

To 30 g of the iron sulfide powder prepared in Comparative Example 1 was added 4 g of calcium hydroxide. This mixture was treated with a ball mill for 30 minutes to prepare an iron oxide/calcium hydroxide mixture composition. X-ray diffractometry revealed that this composition was a mixture of mackinawite iron sulfide and calcium hydroxide. Analysis for composition determination revealed that the molar proportions of the respective components were represented by $FeCa_{0.19}Na_{0.22}S_{0.99}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test was a mixture of sulfur and iron(III) oxide, which are products of decomposition of iron sulfide, and of calcium hydroxide and calcium carbonate. No peak attributable to an iron sulfide was observed.

Comparative Example 3

Figure 4:
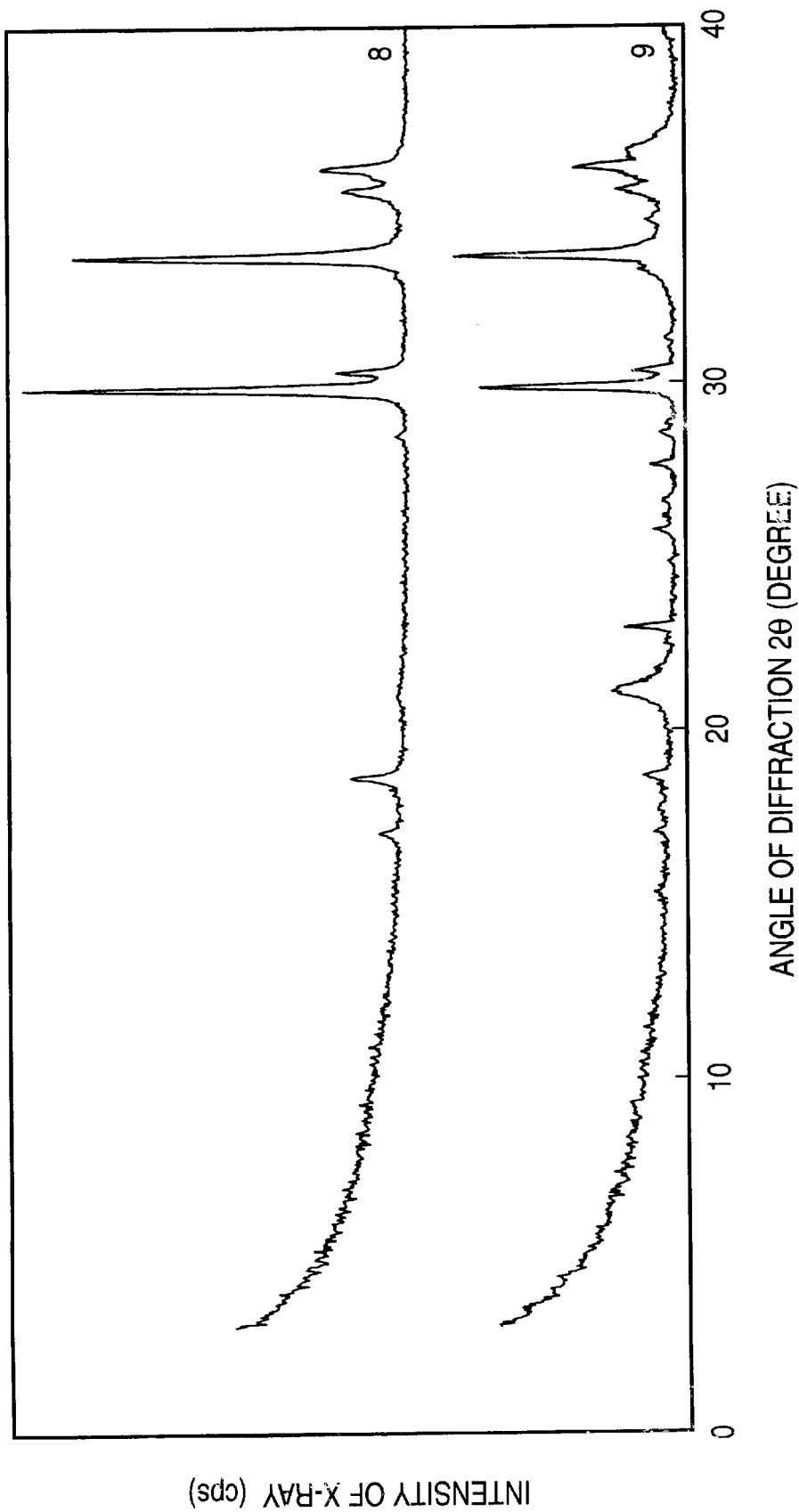
FIG. 4 shows the results of analyses by X-ray diffractometry of the iron sulfide powder prepared in Comparative Example 3 and of this powder which had undergone a one day durability test at 70° C. and 70% RH, in which X axis (abscissa) indicates angle of diffraction 2θ (degree) and Y axis (ordinate) indicates the intensity of X-ray (unit: cps)

Commercial iron(II) sulfide lump of reagent grade was pulverized to obtain an iron sulfide powder. X-ray diffractometry revealed that the iron sulfide powder obtained had a pyrrhotite structure. The X-ray diffraction chart obtained is shown in FIG. 4.

Subsequently, part of the iron sulfide powder obtained was placed in a thermo-hygrostatic chamber having a temperature of 70° C. and a relative humidity of 70% and allowed to stand therein for 1 day to conduct a durability test. As a result of the analysis by X-ray diffractometry of the powder which had undergone the durability test, peaks attributable to a pyrrhotite structure and to sulfur, which is a product of decomposition of iron sulfide, were observed. The X-ray diffraction chart obtained is shown in FIG. 4.

The results of Example 1 and Comparative Examples 1, 2 and 3 show that the iron sulfide according to the invention had far higher durability than the known synthetic iron sulfides. In addition, the calcium added is judged not to have been present as a mere mixture but to have been incorporated into the iron sulfide. The results of Examples 1 to 4 show that the higher the slurry pH, the more the calcium was apt to be incorporated into the iron sulfide, and that the larger the amount of calcium incorporated, the better the stability of the iron sulfide. The results further show that the amount of an alkaline earth metal which can be incorporated into an iron oxide has an upper limit, which is presumed to be around 0.4 in the case of calcium, and that addition of calcium in an amount larger than the upper limit results in an iron sulfide/calcium hydroxide mixture composition. From these, it can be judged that in the case where the alkaline earth metal is calcium, an iron sulfide having improved durability of the invention is obtained when the calcium/iron molar ratio is in the range of from 0.03 to 0.4. In FIG. 2, a diffraction peak for the iron sulfide obtained in Example 1 has shifted to the smaller angle side as compared with the corresponding peaks for the iron sulfides obtained in Examples 2 and 3. It is thought that this shift is due to the incorporation of a larger amount of calcium in the iron sulfide.

EXAMPLE 5

Figure 5:
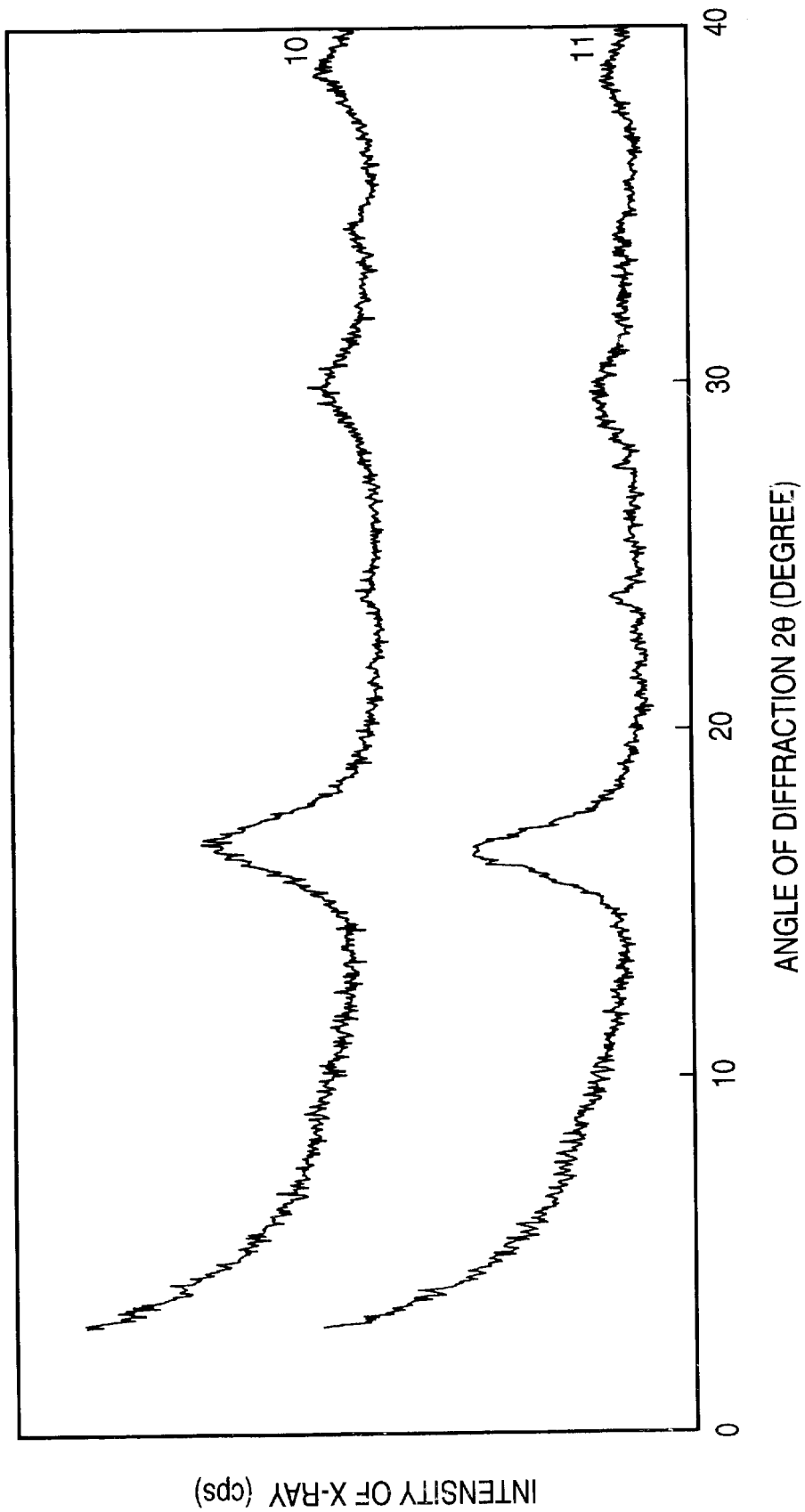
FIG. 5 shows the results of analyses by X-ray diffractometry of the iron sulfide powder prepared in Example 5 and of this powder which had undergone a one day durability test at 70° C. and 70% RH, in which X axis (abscissa) indicates angle of diffraction 2θ (degree) and Y axis (ordinate) indicates the intensity of X-ray (unit: cps)

An iron sulfide slurry was continuously prepared by the same method as in Example 1. Into a glass reactor having a capacity of 2 L was introduced 1,000 ml of the iron sulfide slurry obtained. Thereto was added 83 mmol of barium chloride with stirring. Furthermore, 48% aqueous NaOH solution was added to adjust the slurry pH to 13.0. This slurry was then aged by continuously stirring it for 60 minutes. The slurry obtained after the aging was filtered, and the obtained cake was washed, dried, and then pulverized to obtain an iron sulfide powder. X-ray diffractometry revealed that the iron sulfide powder obtained had a mackinawite structure. The X-ray diffraction chart obtained is shown in FIG. 5. Analysis for composition determination revealed that the molar proportions of the respective components were represented by $FeBa_{0.078}Na_{0.014}S_{0.96}$.

Subsequently, part of the iron sulfide powder obtained was placed in a thermo-hygrostatic chamber having a temperature of 70° C. and a relative humidity of 70% and allowed to stand therein for 1 day to conduct a durability test. The powder which had undergone the durability test was found to have a mackinawite structure and no peak attributable to sulfur or iron(III) oxide, which are products of decomposition of iron sulfide, was observed. The X-ray diffraction chart obtained is shown in FIG. 5. The proportion of the residual iron sulfide was calculated from the ratio between the main peak intensity for the iron sulfide before the durability test and that for the iron sulfide after the test, and was found to be 93%.

EXAMPLE 6

An iron sulfide slurry was continuously prepared by the same method as in Example 1. Into a glass reactor having a capacity of 2 liters was introduced 1,000 ml of the iron sulfide slurry obtained. Thereto was added 66 mmol of strontium chloride with stirring. Furthermore, 48% aqueous NaOH solution was added to adjust the slurry pH to 13.1. This slurry was then aged by continuously stirring it for 60 minutes. The slurry obtained after the aging was filtered, and the obtained cake was washed, dried, and then pulverized to obtain an iron sulfide powder. X-ray diffractometry revealed that the iron sulfide powder obtained had a mackinawite structure. Analysis for composition determination revealed that the molar proportions of the respective components were represented by $FeSr_{0.095}Na_{0.023}S_{0.98}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a mackinawite structure and no peak attributable to sulfur or iron(III) oxide was observed. The proportion of the residual iron sulfide was calculated from the ratio between the main peak intensity for the iron sulfide before the durability test and that for the iron sulfide after the test, and was found to be 88%.

EXAMPLE 7

An iron sulfide slurry was continuously prepared by the same method as in Example 1. Into a glass reactor having a capacity of 2 liters was introduced 1,000 ml of the iron sulfide slurry obtained. Thereto was added 130 mmol of magnesium chloride with stirring. Furthermore, 48% aqueous NaOH solution was added to adjust the slurry pH to 12.9. This slurry was then aged by continuously stirring it for 60 minutes. The slurry obtained after the aging was filtered, and the obtained was washed, dried, and then pulverized to obtain an iron sulfide powder. X-ray diffractometry revealed that the iron sulfide powder obtained had a mackinawite structure. Analysis for composition determination revealed that the molar proportions of the respective components were represented by $FeMg_{0.37}Na_{0.068}S_{0.95}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a mackinawite structure and light peaks attributable to sulfur, which is a product of decomposition of iron sulfide, were observed. The proportion of the residual iron sulfide was calculated from the ratio between the main peak intensity for the iron sulfide before the durability test and that for the iron sulfide after the test, and was found to be 72%.

The results of Examples 5 to 7 show that the alkaline earth metals other than calcium also functioned to improve the durability of a synthetic iron sulfide.

EXAMPLE 8

Figure 6:
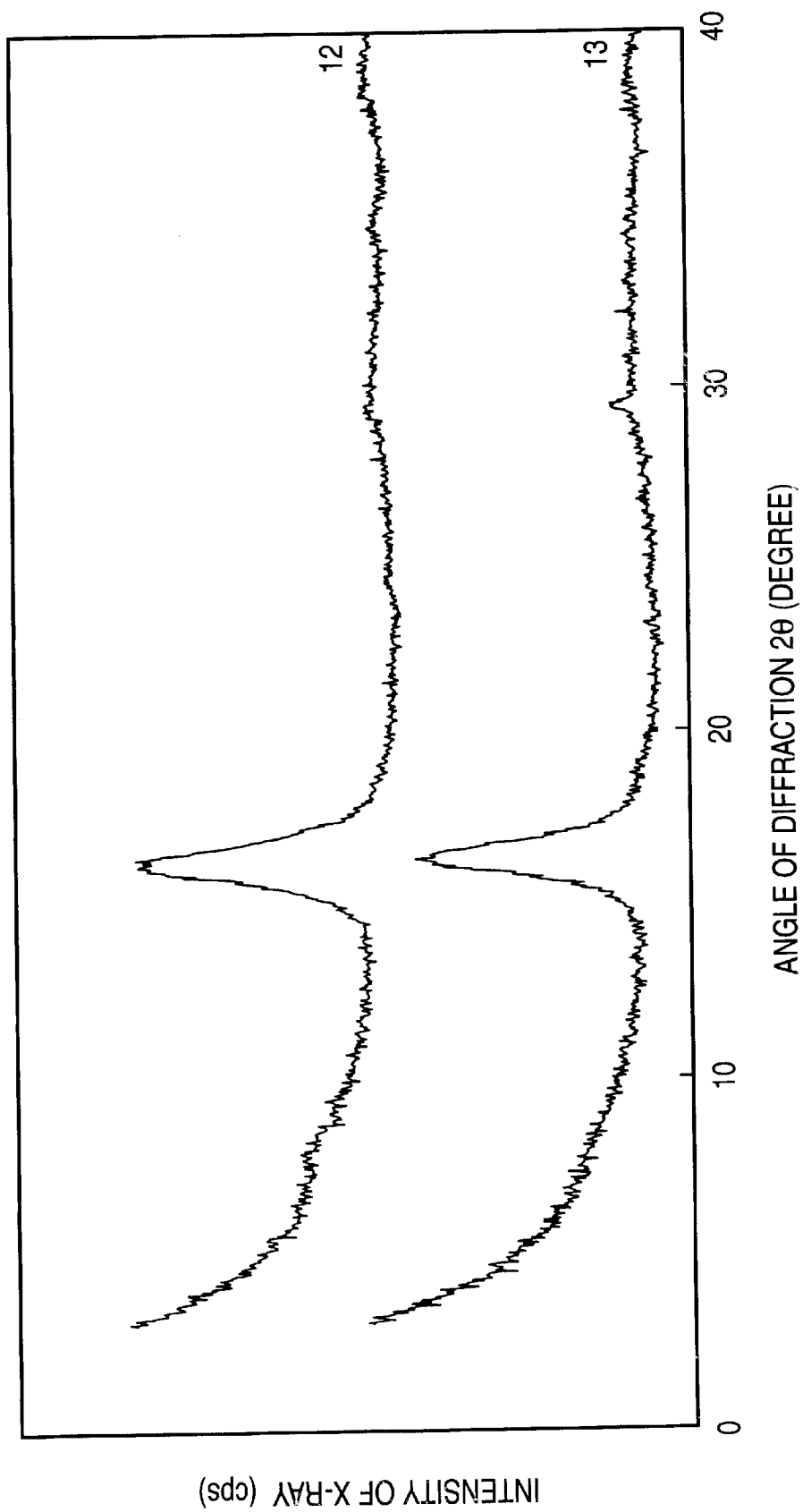
FIG. 6 shows the results of analyses by X-ray diffractometry of the iron sulfide powder prepared in Example 8 and of this powder which had undergone a one day durability test at 70° C. and 70% RH, in which X axis (abscissa) indicates angle of diffraction 2θ (degree) and Y axis (ordinate) indicates the intensity of X-ray (unit: cps)

Into a glass reactor having a capacity of 2 liters were introduced 480 mmol of sodium hydrosulfide of commercial reagent grade, 720 mmol of sodium hydroxide, and 1,000 g of water. The contents were kept at 25° C. with a water bath with stirring to dissolve the solids. To this solution was added during 40 minutes a solution prepared by dissolving 480 mmol of iron(II) chloride and 120 mmol of calcium chloride in 600 g of water. After completion of the addition, pH of the resulting slurry was 12.3. This slurry was then aged by continuously stirring it for 30 minutes. The slurry obtained after the aging was filtered, and the obtained cake was washed, dried, and then pulverized to obtain an iron sulfide powder. X-ray diffractometry revealed that the iron sulfide powder obtained had a denatured mackinawite structure showing a broad peak at around 17 to 18°. The X-ray diffraction chart obtained is shown in FIGS. 6 and 8. Analysis for composition determination revealed that the molar proportions of the respective components were represented by $FeCa_{0.16}Na_{0.006}S_{0.90}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a denatured mackinawite structure showing a broad peak at around 17 to 18°, and no peak attributable to sulfur or iron(III) oxide, which are products of decomposition of iron sulfide, was observed. The X-ray diffraction chart obtained is shown in FIG. 6. The proportion of the residual iron sulfide was calculated from the ratio between the main peak intensity for the iron sulfide before the durability test and that for the iron sulfide after the test, and was found to be 91%.

Furthermore, part of the iron sulfide powder obtained was subjected to a 3 months indoor storage test from summer to autumn. X-ray diffractometry revealed that the powder which had undergone the storage test had a denatured mackinawite structure and no peak attributable to sulfur or iron(III) oxide, which are products of decomposition of iron sulfide, was observed.

EXAMPLE 9

Figure 7:
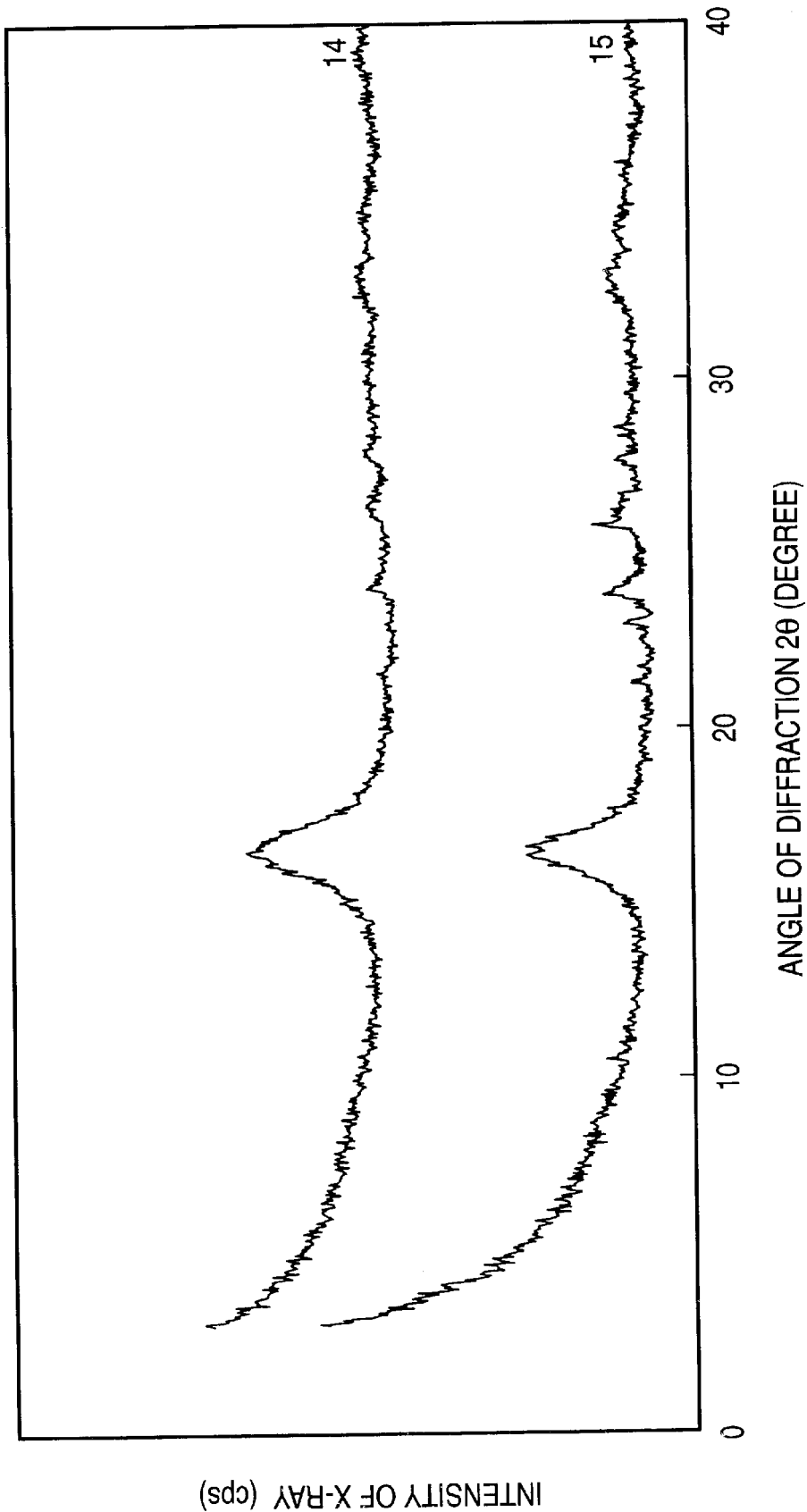
FIG. 7 shows the results of analyses by X-ray diffractometry of the iron sulfide powder prepared in Example 9 and of this powder which had undergone a one day durability test at 70° C. and 70% RH, in which X axis (abscissa) indicates angle of diffraction 2θ (degree) and Y axis (ordinate) indicates the intensity of X-ray (unit: cps)

Into a glass reactor having a capacity of 2 liters were introduced 480 mmol of sodium hydrosulfide of commercial reagent grade, 720 mmol of sodium hydroxide, and 1,000 g of water. The contents were kept at 25° C. with a water bath with stirring to dissolve the solids. To this solution was added during 40 minutes a solution prepared by dissolving 480 mmol of iron(II) chloride and 120 mmol of barium chloride in 600 g of water. After completion of the addition, pH of the resulting slurry was 12.6. This slurry was then aged by continuously stirring it for 30 minutes. The slurry obtained after the aging was filtered, and the solid taken out was washed, dried, and then pulverized to obtain an iron sulfide powder. X-ray diffractometry revealed that the iron sulfide powder obtained had a denatured mackinawite structure showing a broad peak at around 17 to 18°. The X-ray diffraction chart obtained is shown in FIG. 7. Analysis for composition determination revealed that the molar proportions of the respective components were represented by $FeBa_{0.083}Na_{0.028}S_{0.88}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a denatured mackinawite structure showing a broad peak at around 17 to 18°, and slight peaks attributable to sulfur, which is a product of decomposition of iron sulfide, were observed. The X-ray diffraction chart obtained is shown in FIG. 7. The proportion of the residual iron sulfide was calculated from the ratio between the main peak intensity for the iron sulfide before the durability test and that for the iron sulfide after the test, and was found to be 87%.

EXAMPLE 10

Into a glass reactor having a capacity of 2 liters were introduced 480 mmol of sodium hydrosulfide of commercial reagent grade, 720 mmol of sodium hydroxide, and 1,000 g of water. The contents were kept at 25° C. with a water bath with stirring to dissolve the solids. To this solution was added during 40 minutes a solution prepared by dissolving 480 mmol of iron(II) chloride and 120 mmol of strontium chloride in 600 g of water. After completion of the addition, pH of the resulting slurry was 12.4. This slurry was then aged by continuously stirring it for 30 minutes. The slurry obtained after the aging was filtered, and the solid taken out was washed, dried, and then pulverized to obtain an iron sulfide powder. X-ray diffractometry revealed that the iron sulfide powder obtained had a denatured mackinawite structure showing a broad peak at around 17 to 18°. Analysis for composition determination revealed that the molar proportions of the respective components were represented by $FeSr_{0.097}Na_{0.019}S_{0.92}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a denatured mackinawite structure showing a broad peak at around 17 to 18°, and no peak attributable to sulfur or iron(III) oxide, which are products of decomposition of iron sulfide, was observed. The proportion of the iron sulfide was calculated from the ratio between the main peak intensity for the iron sulfide before the durability test and that for the iron sulfide after the test, and was found to be 93%.

EXAMPLE 11

Into a glass reactor having a capacity of 2 liters were introduced 420 mmol of sodium hydrosulfide of commercial reagent grade, 780 mmol of sodium hydroxide, and 1,000 g of water. The contents were kept at 25° C. with a water bath with stirring to dissolve the solids. To this solution was added during 40 minutes a solution prepared by dissolving 420 mmol of iron(II) sulfate and 180 mmol of magnesium sulfate in 600 g of water. After completion of the addition, pH of the resulting slurry was 10.5. This slurry was then aged by continuously stirring it for 30 minutes. The slurry obtained after the aging was filtered, and the solid taken out was washed, dried, and then pulverized to obtain an iron sulfide powder. X-ray diffractometry revealed that the iron sulfide powder obtained had a denatured mackinawite structure showing a broad peak at around 17 to 18°. Analysis for composition determination revealed that the molar proportions of the respective components were represented by $FeMg_{0.37}Na_{0.079}S_{0.94}$.

Subsequently, part of the iron sulfide powder obtained was placed in a thermo-hygrostatic chamber having a temperature of 70° C. and a relative humidity of 70% and allowed to stand therein for 1 day to conduct a durability test. X-ray diffractometry revealed that the powder which had undergone the durability test had a denatured mackinawite structure showing a broad peak at around 17 to 18°, and slight peaks attributable to sulfur, which is a product of decomposition of iron sulfide, were observed. The proportion of the residual iron sulfide was calculated from the ratio between the main peak intensity for the iron sulfide before the durability test and that for the iron sulfide after the test, and was found to be 78%.

The results of Examples 8 to 11 show that when an aqueous solution of a salt of bivalent iron was mixed with an aqueous solution containing sulfur ions in the presence of an alkaline earth metal ingredient, then an iron sulfide having a denatured mackinawite structure was obtained.

EXAMPLE 12

The same procedure as in Example 8 was conducted, except that the amounts of the sodium hydrosulfide, sodium hydroxide, iron(II) chloride, and calcium chloride were changed to 420 mmol, 780 mmol, 420 mmol and 180 mmol, respectively.

After completion of the addition, the slurry pH was 12.6. The powder obtained was an iron sulfide having a denatured mackinawite structure, in which the molar proportions of the respective components were represented by $FeCa_{0.28}Na_{0.002}S_{0.88}$. The X-ray diffraction chart obtained is shown in FIG. 8. The powder which had undergone the durability test was an iron sulfide having a denatured mackinawite structure. The proportion of the residual iron sulfide was 88%.

EXAMPLE 13

The same procedure as in Example 8 was conducted, except that the amounts of the sodium hydrosulfide, sodium hydroxide, iron(II) chloride, and calcium chloride were changed to 360 mmol, 840 mmol, 360 mmol and 240 mmol, respectively.

After completion of the addition, the slurry pH was 12.5. The powder obtained was an iron sulfide having a denatured mackinawite structure, and peaks attributable to a trace amount of calcium hydroxide were observed. The molar proportions of the respective components were represented by $FeCa_{0.39}Na_{0.001}S_{0.91}$. The X-ray diffraction chart obtained is shown in FIG. 8. The powder which had undergone the durability test was an iron sulfide having a denatured mackinawite structure, and peaks attributable to trace amounts of calcium hydroxide and calcium carbonate were observed. The proportion of the residual iron sulfide was 93%.

EXAMPLE 14

The same procedure as in Example 8 was conducted, except that the amounts of the sodium hydrosulfide, sodium hydroxide, iron(II) chloride and calcium chloride were changed to 300 mmol, 900 mmol, 300 mmol and 300 mmol, respectively.

After completion of the addition, the slurry pH was 12.5. The powder obtained was a mixture of an iron sulfide having a denatured mackinawite structure and calcium hydroxide. The molar proportions of the respective components were represented by $FeCa_{0.66}Na_{0.001}S_{0.88}$. The X-ray diffraction chart obtained is shown in FIG. 8. The powder which had undergone the durability test was a mixture of an iron sulfide having a denatured mackinawite structure, calcium hydroxide, and calcium carbonate. The proportion of the residual iron sulfide was 93%.

EXAMPLE 15

The same procedure as in Example 8 was conducted, except that the amounts of the sodium hydrosulfide, sodium hydroxide, iron(II) chloride and calcium chloride were changed to 540 mmol, 660 mmol, 270 mmol and 60 mmol, respectively.

After completion of the addition, the slurry pH was 11.1. The powder obtained was an iron sulfide having a denatured mackinawite structure, in which the molar proportions of the respective components were represented by $FeCa_{0.038}Na_{0.089}S_{0.85}$. The X-ray diffraction chart obtained is shown in FIG. 8. The powder which had undergone the durability test was a mixture of an iron sulfide having a denatured mackinawite structure and sulfur, which was a product of decomposition thereof. The proportion of the residual iron sulfide was 56%.

Comparative Example 4

The same procedure as in Example 5 was conducted, except that the amounts of the sodium hydrosulfide, sodium hydroxide, iron(II) chloride and calcium chloride were changed to 600 mmol, 600 mmol, 600 mmol and 10 mmol, respectively.

After completion of the addition, the slurry pH was 6.8. The powder obtained was an iron sulfide having a mackinawite structure, in which the molar proportions of the respective components were represented by $FeCa_{0.008}Na_{0.14}S_{0.94}$. The powder which had undergone the durability test was a mixture of sulfur and iron(II) oxide, which are products of decomposition of iron sulfide. No peak attributable to an iron sulfide was observed.

The results of Examples 1 to 5 and 12 to 15 show that the iron sulfides having a denatured mackinawite structure had better durability than the iron sulfides having a mackinawite structure. The results of Comparative Example 4 show that when the slurry pH after ingredient addition was lower than 7, the presence of calcium during iron sulfide preparation did not result in incorporation of calcium and in an improvement in durability.

Examples in which iron sulfides of the invention were used to treat heavy metals are shown below together with the results thereof.

EXAMPLE 16

An alkaline fly ash containing 2,400 ppm lead, 160 ppm chromium, and 2.1 ppm mercury was used to examine the property of treating heavy metals. To 100 parts by weight of the alkaline fly ash were added 30 parts by weight of water and various amounts of each of the iron sulfides prepared in Examples and Comparative Examples. The resulting mixture was kneaded to conduct heavy metal treatment. The fly ash thus treated was subjected to the leaching test in accordance with Japanese Environment Agency Notification No. 13 (1973). The results obtained are shown in Table 2.

TABLE 2

| Kind of iron sulfide Used | Amount of iron sulfide added (parts by weight) | Pb leaching (ppm) | Cr leaching (ppm) | Hg leaching (ppb) |
|---|---|---|---|---|
| No iron sulfide (blank) | 0 | 98 | 0.2 | 3.6 |
| Example 1, before durability test | 3 | 14 | 0.02 | 0.8 |
| Example 1, before durability test | 4 | 3.4 | <0.01 | <0.5 |
| Example 1, before durability test | 5 | <0.05 | <0.01 | <0.5 |
| Example 1, after durability test | 5 | <0.05 | <0.01 | <0.5 |
| Example 5, before durability test | 5 | <0.05 | <0.01 | <0.5 |

TABLE 2-continued

| Kind of iron sulfide Used | Amount of iron sulfide added (parts by weight) | Pb leaching (ppm) | Cr leaching (ppm) | Hg leaching (ppb) |
|---|---|---|---|---|
| Example 5, after durability test | 5 | <0.05 | <0.01 | <0.5 |
| Example 6, before durability test | 5 | <0.05 | <0.01 | <0.5 |
| Example 6, after durability test | 5 | <0.05 | <0.01 | <0.5 |
| Example 7, before durability test | 5 | <0.05 | <0.01 | <0.5 |
| Example 7, after durability test | 5 | <0.05 | <0.01 | <0.5 |
| Example 8, before durability test | 3 | 16 | 0.02 | 0.8 |
| Example 8, before durability test | 4 | 2.8 | <0.01 | <0.5 |
| Example 8, before durability test | 5 | <0.05 | <0.01 | <0.5 |
| Example 8, after durability test | 5 | <0.05 | <0.01 | <0.5 |
| Example 9, before durability test | 5 | <0.05 | <0.01 | <0.5 |
| Example 9, after durability test | 5 | <0.05 | <0.01 | <0.5 |
| Example 10, before durability test | 5 | <0.05 | <0.01 | <0.5 |
| Example 10, after durability test | 5 | <0.05 | <0.01 | <0.5 |
| Example 11, before durability test | 5 | <0.05 | <0.01 | <0.5 |
| Example 11, after durability test | 5 | <0.05 | <0.01 | <0.5 |
| Comparative Example 1, before durability test | 5 | <0.05 | <0.01 | <0.5 |
| Comparative Example 1, after durability test | 5 | 71 | 0.07 | 1.2 |
| Comparative Example 3, before durability test | 5 | 45 | 0.05 | 0.8 |
| Comparative Example 3, before durability test | 10 | 31 | 0.03 | <0.5 |
| Comparative Example 4, before durability test | 5 | <0.05 | <0.01 | <0.5 |
| Comparative Example 4, after durability test | 5 | 36 | 0.06 | 1.1 |

The results given in Table 2 show that the heavy metal treating properties of the iron sulfides obtained in the Examples which had not undergone the durability test were almost equal to those of the mackinawite iron sulfides heretofore in use and were far higher than those of the pyrrhotite iron sulfide obtained in a Comparative Example. The results further show that the mackinawite iron sulfides heretofore in use showed deteriorated heavy metal treating properties after the one day durability test at 70° C. and 70% RH, whereas the iron sulfides according to the invention retained their heavy metal treating properties after the durability test.

EXAMPLE 17

A neutral fly ash containing 1,900 ppm lead, 1,100 ppm chromium and 100 ppm cadmium was used to examine the property of treating heavy metals. To 100 parts by weight of the neutral fly ash were added 30 parts by weight of water and various amounts of each of the iron sulfides prepared in the Examples and Comparative Example. The resulting mixture was kneaded to conduct heavy metal treatment. The fly ash thus treated was subjected to the leaching test in accordance with Japanese Environment Agency Notification No. 13 (1973). The results obtained are shown in Table 3.

TABLE 3

| Kind of iron sulfide used | Amount of iron sulfide added (parts by weight) | Pb leaching (ppm) | Cr leaching (ppm) | Cd leaching (ppm) |
|---|---|---|---|---|
| No iron sulfide (blank) | — | 18 | 0.03 | 3.8 |
| Example 8, before durability test | 3 | 3.7 | 0.02 | 0.32 |
| Example 8, before durability test | 4 | 0.1 | <0.01 | 0.02 |
| Example 8, before durability test | 5 | <0.05 | <0.05 | <0.01 |
| Example 8, after durability test | 5 | <0.05 | <0.05 | <0.01 |
| Example 9, before durability test | 5 | <0.05 | <0.05 | <0.01 |
| Example 9, after durability test | 5 | <0.05 | <0.05 | <0.01 |
| Comparative Example 1, before durability test | 5 | <0.05 | <0.05 | <0.01 |
| Comparative Example 1, after durability test | 5 | 12 | 0.02 | 2.1 |

The results given in Table 3 show that the iron sulfides obtained in Examples 8 and 9 were effective also in the treatment of heavy metals contained in a neutral fly ash. The results further show that these iron sulfides were almost equal in initial treating properties to the synthetic iron sulfide of Comparative Example 1 heretofore in use and had far higher durability than it.

EXAMPLE 18

A contaminated model soil (water content, 50 wt %) containing 7,700 ppm lead, 470 ppm cadmium, 1,800 ppm hexavalent chromium, 96 ppm arsenic and 2,200 ppm selenium was used to examine the property of treating heavy metals. To 100 parts by weight of the soil was added each of the iron sulfides prepared in Examples and a Comparative Example. The resultant mixture was kneaded to conduct heavy metal treatment. The soil thus treated was subjected to the leaching test in accordance with Japanese Environment Agency Notification No. 46 (1991). The results obtained are shown in Tables 4 and 5.

TABLE 4

| Kind of iron sulfide Used | Amount of iron sulfide added (parts by weight) | Pb leaching (ppm) | Cd leaching (ppm) | Cr leaching (ppm) |
|---|---|---|---|---|
| No iron sulfide (blank) | — | <0.05 | 13 | 6.0 |
| Example 1, before durability test | 10 | <0.05 | <0.01 | 0.02 |
| Example 1, after durability test | 10 | <0.05 | <0.01 | 0.02 |
| Example 8, before durability test | 10 | <0.05 | <0.01 | 0.02 |
| Example 8, after durability test | 10 | <0.05 | <0.01 | 0.02 |
| Comparative Example 1, before durability test | 10 | <0.05 | <0.01 | <0.01 |
| Comparative Example 1, after durability test | 10 | <0.05 | 4.6 | 1.9 |

TABLE 5

| Kind of iron sulfide used | As leaching (ppm) | Se leaching (ppm) |
|---|---|---|
| No iron sulfide (blank) | 0.03 | 1.1 |
| Example 1, before durability test | <0.01 | 0.06 |
| Example 1, after durability test | <0.01 | 0.08 |
| Example 8, before durability test | <0.01 | 0.06 |
| Example 8, after durability test | <0.01 | 0.08 |
| Comparative Example 1, before durability test | <0.01 | 0.05 |
| Comparative Example 1, after durability Test | <0.01 | 0.86 |

The results given in Tables 4 and 5 show that the iron sulfides obtained in Examples 1 and 8 were effective also in the treatment of heavy metals contained in a soil. The results further show that these iron sulfides were almost equal in initial treating properties to the mackinawite iron sulfide obtained in Comparative Example 1 and had far higher durability than the mackinawite iron sulfide.

EXAMPLE 19

To each of six model wastewaters, i.e., a solution containing 10 ppm lead, solution containing 10 ppm cadmium, solution containing 1 ppm mercury, solution containing 10 ppm hexavalent chromium, solution containing 10 ppm arsenic and solution containing 10 ppm selenium, was added 0.2 parts by weight of each of the iron sulfides prepared in Examples 1 and 8 to examine the heavy metal treating properties of the iron sulfides. After the iron sulfides were added to the model wastewaters, each resulting mixture was stirred for 30 minutes and then filtered through a glass filter paper (GS-25, manufactured by Advantec Toyo Co.). The amounts of the heavy metals contained in the filtrates were determined. The results obtained are shown in Table 6.

TABLE 6

| Kind of model wastewater | Heavy metal amount after treatment with iron sulfide of Example 1 (ppm) | Heavy metal amount after treatment with iron sulfide of Example 8 (ppm) |
|---|---|---|
| Lead 10 ppm solution | <0.05 | <0.05 |
| Cadmium 10 ppm solution | <0.01 | <0.01 |
| Mercury 1 ppm solution | <0.005 | <0.005 |
| Hexavalent chromium 10 ppm Solution | <0.01 | <0.01 |
| Arsenic 10 ppm solution | 0.37 | 0.39 |
| Selenium 10 ppm solution | 0.17 | 0.15 |

The results given in Table 6 show that the iron sulfides according to the invention were effective also in the treatment of heavy metals contained in wastewaters.

The invention produces the following effects.

1) The iron sulfides of the invention have a mackinawite structure having a novel composition which has not been known. They have excellent heavy metal treating properties and excellent durability.

2) The processes of the invention can easily produce the excellent iron sulfides.

3) The heavy metal treating agent of the invention, which comprises either of the excellent iron sulfides as an effective component, is effective in treating heavy metals contained in ashes, soils, wastewaters, etc. to make them harmless.

What is claimed is:

1. An iron sulfide with excellent durability having a mackinawite structure which contains $FeM_xN_yS_z$ wherein M represents an alkaline earth metal, N represents an alkali metal, and x, y and z, indicating the molar proportions of the respective elements, represent numbers satisfying $0.01 < x \leq 0.5$, $y \leq 0.2$ and $0.7 \leq z \leq 1.4$, as an essential component.

2. An iron sulfide with excellent durability having a mackinawite structure which contains $FeM'_xN_yS_z$ wherein M represents Ca, Mg or combination thereof, N represents an alkali metal, and x, y and z, indicating the molar proportions of the respective elements, represent numbers satisfying $0.01 < x \leq 0.5$, $y \leq 0.2$ and $0.7 \leq z \leq 1.4$, as an essential component.

3. The iron sulfide as claimed in claims 1 or 2, wherein the mackinawite structure is a denatured mackinawite structure which gives an XRD pattern wherein spacing between 001 planes has increased in c axis direction to a value of from 5.03 A to 5.53 A and the ratio of the intensity for the diffraction peak attributable to any other hkl planes to that for the diffraction peak attributable to the 001 planes is 20/100 or lower.

4. A process for producing the iron sulfide of claim 1 or 2, which comprises mixing an aqueous solution of a salt of bivalent iron, an aqueous solution containing sulfur ions and an alkaline earth metal ingredient and adjusting the pH of the resulting slurry to 7.0 or higher.

5. The process as claimed in claim 4, wherein the alkaline earth metal is calcium and/or magnesium.

6. A process for producing the iron sulfide of claim 3, which comprises mixing an aqueous solution of a salt of bivalent iron with an aqueous solution containing sulfur ions in the presence of an alkaline earth metal ingredient to prepare a slurry and adjusting pH of the slurry to 7.0 or higher.

7. The process as claimed in claim 5, wherein the alkaline earth metal is calcium and/or magnesium.

\* \* \* \* \*